E. M. JONES.
THERMO HYGROSTAT.
APPLICATION FILED JULY 20, 1914.

1,162,490.

Patented Nov. 30, 1915.
5 SHEETS—SHEET 1.

Witnesses
F. E. Barry
L. A. Stanley

Inventor
Elmer M. Jones
By
Munn & Co.
Attorneys

E. M. JONES.
THERMO HYGROSTAT.
APPLICATION FILED JULY 20, 1914.

1,162,490.

Patented Nov. 30, 1915.
5 SHEETS—SHEET 2.

WITNESSES

INVENTOR
Elmer M. Jones
BY
ATTORNEYS

E. M. JONES.
THERMO HYGROSTAT.
APPLICATION FILED JULY 20, 1914.
1,162,490.
Patented Nov. 30, 1915.
5 SHEETS—SHEET 3.
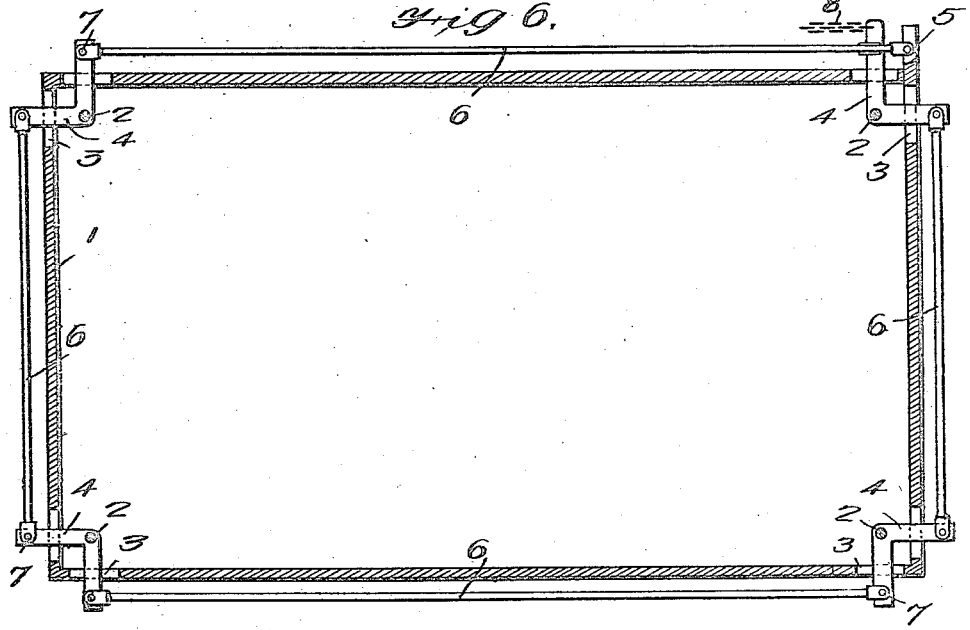
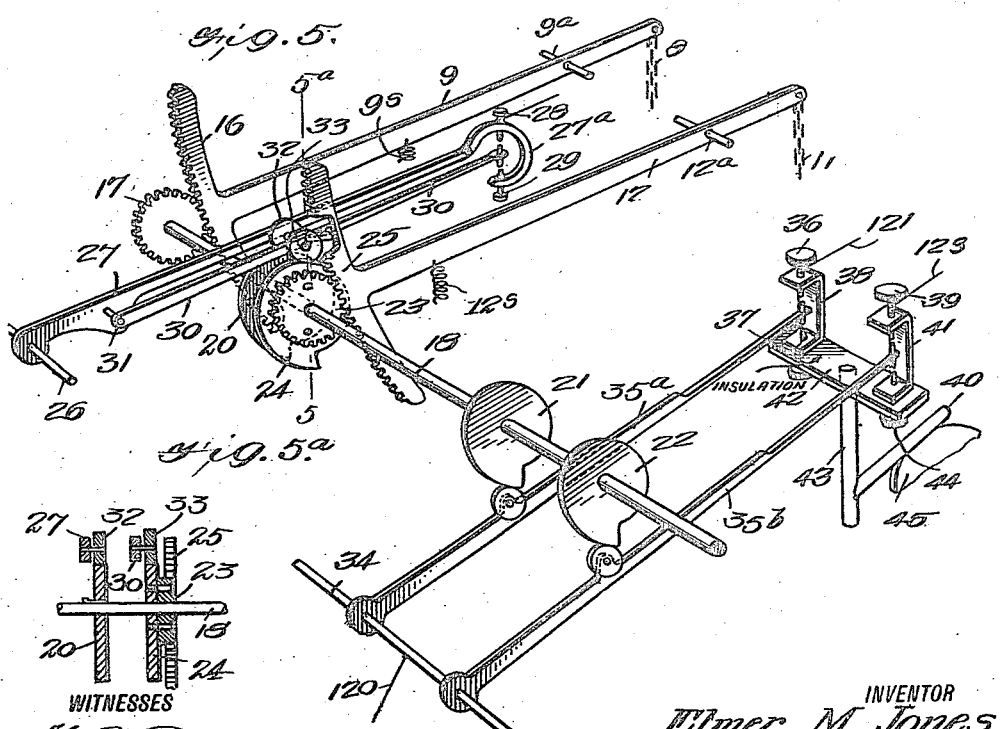
WITNESSES
H. E. Barry
L. A. Stanley
INVENTOR
Elmer M. Jones
BY
Munn & Co.
ATTORNEYS

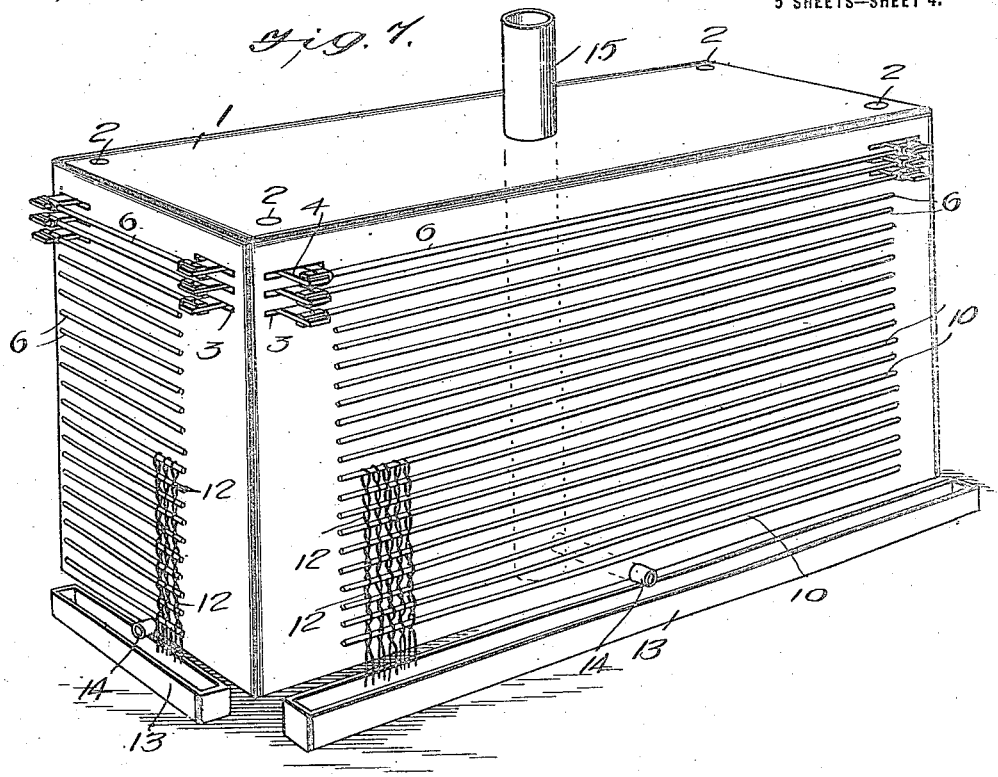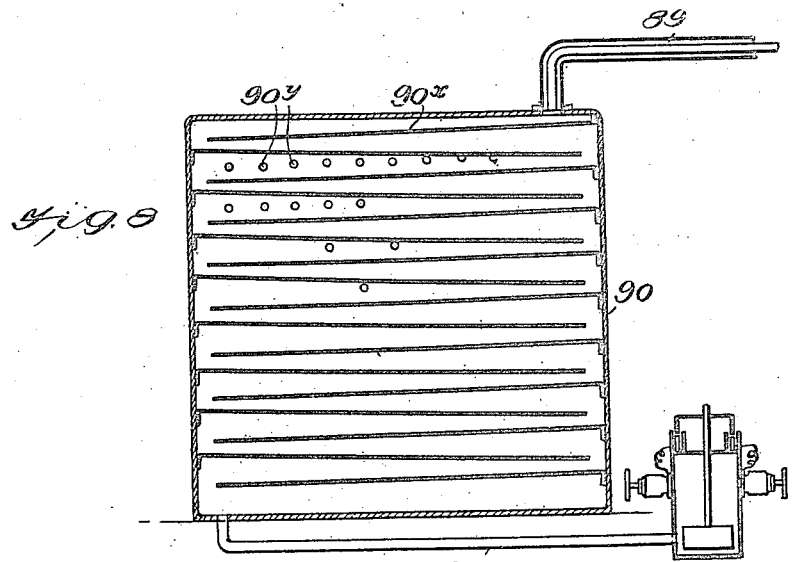

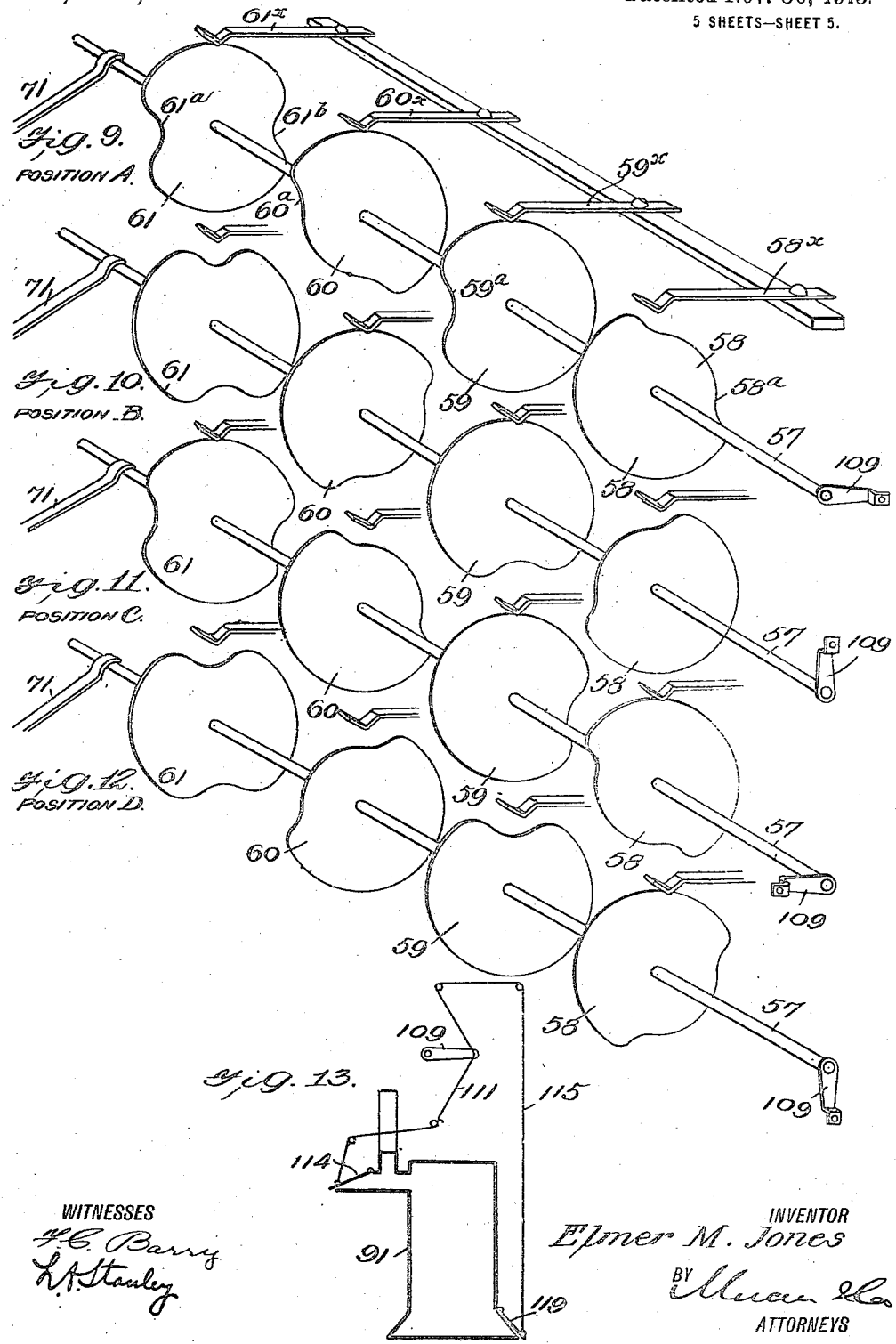

UNITED STATES PATENT OFFICE.

ELMER M. JONES, OF ADRIAN, MICHIGAN.

THERMO-HYGROSTAT.

1,162,490.

Specification of Letters Patent. Patented Nov. 30, 1915.

Application filed July 20, 1914. Serial No. 852,030.

*To all whom it may concern:*

Be it known that I, ELMER M. JONES, a citizen of the United States, and a resident of Adrian, in the county of Lenawee and State of Michigan, have made certain new and useful Improvements in Thermo-Hygrostats, of which the following is a specification.

My invention relates to improvements in devices for automatically regulating the temperature and humidity of the air in sleeping rooms, living rooms, hospitals, etc., and it consists in the combinations, constructions and arrangements herein described and claimed.

An object of my invention is to provide a device which is relatively simple in its nature, but which operates positively to regulate the hygrostatic conditions without the necessity of frequent adjustment.

A further object of my invention is to provide a device of the type described in which the desired amount of humidity may be varied at will.

Other objects and advantages will appear in the following specification and the novel features of the device will be particularly pointed out in the appended claims.

My invention is illustrated in the accompanying drawings forming part of this application in which—

Figure 1:
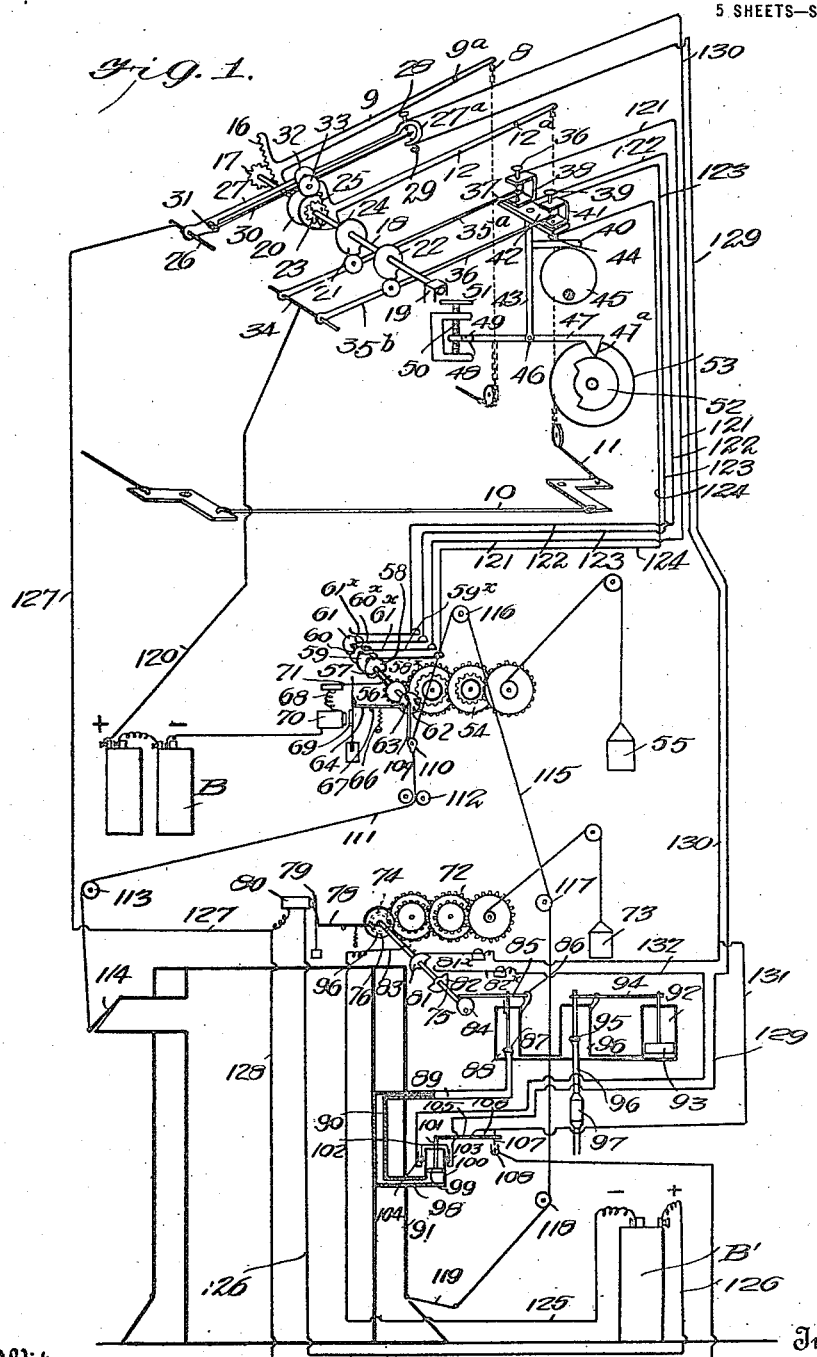
Figures 2, 3, 4:
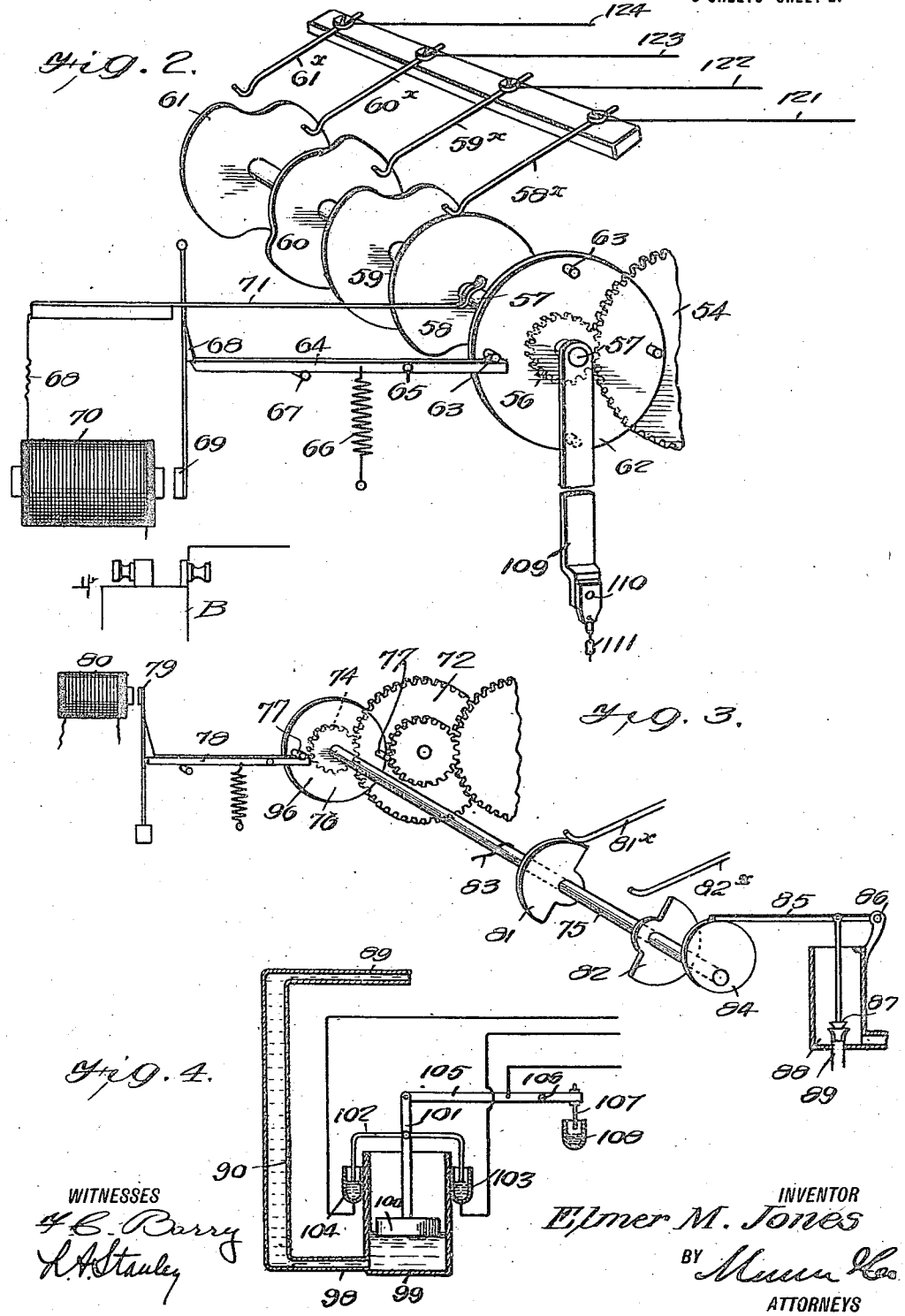

Figure 1 is a diagrammatic view of the apparatus as a whole, Fig. 2 is a perspective view of a portion of the electric contact device, Fig. 3 is a perspective view of a portion of the means for controlling the flow of water, Fig. 4 is a section through the vaporizer and certain parts connected therewith, Fig. 5 is a perspective view showing in detail the arms of the thermostat and the contacts controlled thereby, Fig. 5ᵃ is a section along the line 5ᵃ—5ᵃ of Fig. 5, Fig. 6 is a sectional view through the thermostat, Fig. 7 is a perspective view of the thermostatic device, Fig. 8 is a sectional view through the vaporizer, Figs. 9, 10, 11 and 12 are diagrammatic views showing the various positions of the contact members illustrated in Fig. 2, and Fig. 13 is a diagrammatic view showing the connections of the furnace doors to the operating room.

In order to have a thorough understanding of the construction and operation of this device, it is necessary to consider certain aspects or conditions to be met with in the regulation of the humidity and temperature as set forth. If there is an abundance of moisture in the air a thermometer will register the same number of degrees whether the bulb is dry or is moistened with water. On the other hand, if the air contains little moisture it will cause the moist bulb of the thermometer to register lower than the dry one. The apparatus for regulating the humidity involves the use of a "dry wire" thermostat and a "wet wire" thermostat as hereinafter described. I will first describe the construction and operation of the thermostat. Referring then to Figs. 6 and 7 I have shown a casing 1 having vertically extending rods 2 carried thereby. The sides of the casing are provided with slots 3 through which the ends of bell-crank levers 4 are designed to pass, these levers being pivotally mounted on the rod 2, as shown in Fig. 6. Secured to the casing at 5 is one of a plurality of expansion wires 6. These wires may be made of any suitable material such as zinc. It will be noted that the wires 6 are pivotally connected at 7 to the arms of the bell-crank levers 4. The arrangement forms a compact expansion device, one end of the expansion device being secured to the casing at 5, as stated, and the other end being attached by means of a chain 8, or other suitable member to the end of a lever 9. This arrangement is what I term the "dry wire" thermostat. It will be observed in Fig. 6 only a few of the levers are shown, but it will be understood that all of the wires 6 are connected in series in the manner described and form part of the expansion member.

The wet wire thermostat may be formed on the same casing with the dry wire thermostat. To this end the lower wires 10 are designed to be attached to levers similar to the levers 4, one end of the lower wires being secured to the casing in a similar manner to that shown in Fig. 6 the other end being secured by means of the flexible member 11 to a lever 12. The wires 10 are interwoven with cotton string 12 whose ends dip into troughs 13 supplied with water from pipes 14 which communicate with a main inlet pipe 15. In the drawing I have shown these strings or threads as being spaced apart, but it is obvious that they may be closer together, the intent being to keep the wires 10 moist at all times. As explained above the wet wires are separate from the dry wires, and act substantially as a separate thermostat, the casing 1 being merely to hold both thermostats conveniently.

In Fig. 5 I have shown certain details of construction in which the operating lever 9, which, as described, is connected with the dry wire thermostat, is pivoted at 9ª and is provided with a segment 16 arranged to mesh with a gear or pinion 17 on a shaft 18. The shaft 18 is rotatably mounted in bearings 19, (see Fig. 1) and is provided with cam wheels 20, 21 and 22 respectively. Loosely mounted on the shaft 18 is a gear 23 to which is secured a cam wheel 24. The gear 23 is in mesh with a segment 25 at the end of the lever 12. The latter is pivoted at 12ª, and is operated by the wet wire thermostat in the manner hereinafter described.

Pivotally mounted on a shaft 26 is a conducting arm 27 whose opposite end is formed in the shape of an open loop 27ª. This loop is provided with upper and lower adjustable contact screws 28 and 29 respectively which are insulated from the loop itself, and whose ends form contact points arranged to be engaged by the end of a conducting arm 30 which is pivoted at 31 to the arm 27. An antifriction wheel 32 is carried by the arm 27, and an antifriction wheel 33 is carried by the arm 30. The former wheel is designed to be engaged by the cam wheel 20 and the wheel 33 is in alinement with and is designed to be engaged by the cam wheel 24.

Pivotally mounted on a shaft 34 are a pair of conducting arms 35ª and 35ᵇ respectively. The end of the arm 35ª is arranged to engage the ends of adjustable contact screws 36 and 37 carried by a bracket 38, while the end of the arm 35ᵇ is arranged to engage similar contact screws 39 and 40 carried by a bracket 41. The brackets 38 and 41 are mounted on an insulating plate 42 which is supported by a rod 43. The rod 43 bears an arm 44 which rests on the top of an eccentrically mounted disk 45, the purpose of which will be explained later. The rod 43 is pivotally connected at 46 (see Fig. 1) to a lever 47 pivotally mounted at 48 on a movable block 49, which is threaded to receive an adjusting screw 50 having a thumb wheel 51. The outer end of the lever 47 is provided with a downwardly extending end 47ª which is arranged to bear normally on a cam disk 52 carried by a dial 53.

Referring now particularly to Figs. 1 and 2 it will be seen that I have provided a clock train which I have shown in general at 54, and which is designed to be actuated by a weight 55. The train drives a gear 56 on a shaft 57. The latter bears four contact wheels 58, 59, 60 and 61, which are normally engaged by spring contacts 58ˣ, 59ˣ, 60ˣ and 61ˣ respectively. As will be seen from Figs. 2 and 9 to 12 inclusive the wheel 58 has a cut-away portion 58ª along its periphery. The wheel 59 has a small cut-away portion or recess 59ª. The wheel 60 has a recess 60ª, while the wheel 51 has two recesses 61ª, and 61ᵇ substantially 180° apart. On the end of the shaft 57 is a disk 62, which is provided with stop members 63 arranged to engage the end of a lever 64 which is pivoted at 65, and which is held normally by means of a spring 66 against a stop pin 67. The stop members 63 when engaging the lever 64 tend to force the opposite end of the latter upwardly against a locking lug 68 carried by an armature 69 of a magnet 70. The coils of the magnet are connected in circuit with a contact spring 71 whose end is in constant engagement with the shaft 57 as shown.

Referring now to Figs. 1 and 3 I have shown a second clock train which I have denoted in general by 72 and which is driven by a weight 73. The train 72 is in mesh with a gear 74 on a shaft 75. The latter bears a disk 76 provided with stop members 77 arranged to engage the end of a lever 78 which is held by the armature 79 of a magnet 80 similar to that described in connection with the lever 64. Contact segments 81 and 82 are provided on this shaft each being arranged to be engaged by contact springs 81ˣ and 82ˣ respectively when the shaft 75 is in certain positions. A spring 83 is normally in contact with the shaft 75 at all times.

The end of the shaft 75 bears a cam wheel 84 which engages a lever 85 pivoted at 86 and connected with the valve stem of a valve 87 disposed in a chamber 88. The valve 87 controls a pipe 89 leading to the vaporizer 90 which is carried by the furnace 91. The chamber 88 communicates with a chamber 92 having therein a float 93 which is connected by means of a lever 94 with the valve stem of a valve 95 in a chamber 96 which communicates with the chambers 88 and 92. The valve 95 controls an inlet 96 which is provided with a filter 97.

Referring now particularly to Fig. 4 it will be seen that the bottom of the vaporizer is provided with a pipe 98 which enters a float chamber 99 whose float 100 has a stem 101 bearing a U-shaped contact member 102, the ends of which are arranged to dip in mercury cups 103 and 104 on opposite sides of the chamber. The stem 101 connects with a lever 105 which is pivoted at 106 and which is provided with a contact 107 arranged to dip into a mercury cup 108.

The end of the shaft 57 is provided with a laterally extending arm 109 having a laterally bent end bearing a loosely mounted disk or plate 110. This disk or plate is connected by means of a flexible cord or cable 111 which passes between two guide pulleys at 112 and over a guide pulley 113 and is fastened to the check damper 114. A second cord or cable 115 passes over a pulley 116 and is connected to the loosely mounted disk 110 at one end. It passes over guide pulleys 117 and 118 and is connected to the direct draft door 119 of the furnace. It will be seen that these cords 111 and 115 virtually form one continuous cord extending from the draft door to the check damper, and that these cords are moved simultaneously by the movement of the disk 110.

Two batteries B and B' are preferably used with this system. The former is connected by means of the conductor 120 with the pivot rod 34. The other terminal of the battery is connected with the magnet 70 which, as stated, is in electrical connection with the spring 71. The wires or conductors 124, 121, 123, and 122 connect the contact springs $58^x$, $59^x$, $60^x$ and $61^x$ with the contact screws 44, 36, 39 and 37 respectively. One terminal of the battery B' is connected by means of the conductor 125 with the spring 83, the other terminal of the battery being connected by means of the conductor 126 with the magnet 80. A conductor 127 connects the magnet 80 with the pivot rod 26. A branch wire 128 leads from the conductor 127 to the mercury cup 108. A wire 129 connects the mercury cup 103 with the contact screw 29. A wire 130 connects the contact screw 28 with the spring contact $81^x$. A branch wire 131 from the wire 130 leads to the lever 105, while a wire 132 connects the spring contact $82^x$ with the mercury cup 104.

In Fig. 8 I have illustrated the form of vaporizer which may be advantaneously used in this system, although it is apparent that any suitable form of vaporizer may be used. The vaporizer which I have designated in general by 90 consists of an outer casing having a series of inclined shelves $90^x$ secured to the opposite sides of the casing, the ends of the shelves on one side terminating short of the casing on the opposite side, thereby providing a tortuous path for the water which is admitted by the pipe 89. The casing is provided with a series of perforations $90^y$ for permitting the escape of vapor into the atmosphere and is connected by the pipe 98 with the float chamber 99, as already stated.

The cam wheels 20 and 24 are designed to operate so as to compensate for difference of reading of the wet wire and the dry wire. Suppose we set the hygrostat for a humidity of 75. If the room temperature is at 60° F., the wet wire reading should be $55\frac{1}{2}°$ (see Mason's *Hygrometer Tables*). This gives a difference of $4\frac{1}{2}°$. At 70° F., the wet wire reading should be $64\frac{1}{2}°$, a difference of $5\frac{1}{2}°$; at 75° the wet wire is at 69°, a difference of 6°; at 80° the wet wire is at 74°, a difference of 6°; at 90° the wet wire is at 83°, a difference of 7°. The cam wheels 20 and 23 are so related to each other that any rotation of the wheel 23 that represents a departure from the difference in degrees as required at any particular temperature will actuate the contact pins 28 and 29.

The cam wheels 21 and 22 are so formed that the arm $35^b$ engages the contact screw 39, one degree sooner than the arm $35^a$ engages the contact 36, although the two arms may be moving at the same time. The arm $35^b$ also engages the lower contact 44 one degree sooner than the arm $35^a$ engages the lower contact 37.

From the foregoing description of the various parts of the device the operation thereof may be readily understood. Suppose there is very little moisture in the air. If the room grows hot the expansion of the thermostatic member connected to the arm 9 and also of the thermostatic member connected to the arm 12 will permit both of these arms to move under the action of the springs $9^s$ and $12^s$ respectively (see Fig. 5) but the lever 12 is connected to the wet wire system, and consequently there will be a difference of radius in the cams which will cause the arm 30 to lower until contact is made at 29. Water is now running into the vaporizer and the room will be at the proper water content in a short time. When this point is reached the wheel 24 will rotate clockwise as there is now a less difference between the wet and the dry wire. This causes the arm 30 to rise and touch the contact 28. A circuit is now closed from the positive pole of the battery B' (see Fig. 1) through 126, 80, 127, 26, 30, 28, 130, $81^x$, 81, 75, 83, 125 back to battery. The magnet 80 on pulling up releases the arm 78 which permits the shaft 75 to rotate into position 2 in which connection is made between the spring contact $82^x$ and the semicircular contact 82 while connection is broken between $81^x$ and 81. The rotation of the cam 84 causes the closing of the valve 87, thereby shutting off the water which flows through the pipe 89 into the vaporizer 90. Since no water is now running the moisture content of the room will be gradually lowered and the wet wire thermostat will become cooler, thus contracting and causing the lever 12 to rise and the wheel 24 to rotate counter-clockwise. This causes a difference in the radii of the two wheels 20 and 24 and the arm 30 now lowers and makes contact at 29. A circuit is now established from the positive pole of the battery B' through wire 126, magnet 80, 127, 26, 30, 29, 129, 103, 102, 104, 132, $82^x$, 82, 75, 83, 125 to the negative pole of the battery. The operation of the magnet 80 causes the release of the stop arm 78, thereby permitting the shaft 75 to rotate under the action of the clock work 74 into the first position. As the cam wheel 84 comes under the arm 85, it raises the valve 87 so as to permit the water now to flow into the vaporizer. The instrument will thus continue to work until the water is either out of the regulator or until some accident happens to the furnace or other mechanism. Suppose the water should be left turned on when the apparatus is in position 1, that is to say, when the contacts 81 and 81$^x$ are in engagement. There will then be an overflow into the pipe 98 and water will lift the float 99 thus lifting the connecting wire 102 out of the mercury cups 104 and 103 and breaking the circuit traced above at this point. Now if there should be a response from contact 29 and wire 129 the apparatus would not (if in position 2) be thrown into position 1 because the circuit is broken at 103 and 104. Suppose that the accident took place when the wheel 82 was in position 1. As lever 105 is raised its terminal 107 lowers and dips into the circuit 108. This completes the circuit through the positive pole of the battery B' through 126, magnet 80, 128, 108, 107, 105, 131, 130, 81$^x$, 81, 75, 83, 125 to negative pole of battery. This will actuate the apparatus to turn to position 2 with the water shut off from the system and it will remain shut off until the water is removed from 98 when the system will resume its normal action. The circuit just traced is an emergency circuit and is not intended to operate except at time of accident.

It is to be remembered that the arm 35$^b$ will engage the contacts 39 and 44 always before the arm 35$^a$ will engage the contacts 36 and 37 because there is 1° of difference between the two.

Consider now position A of the set of contact members 58, 59, 60 and 61. This is a neutral position in which the check draft 114 and the front draft 119 are both almost closed. The contact wheels 59, 60 and 61 are touching their respective spring contacts 59$^x$, 60$^x$ and 61$^x$. If the room grows too hot, the arms 35$^a$ and 35$^b$ lower; if the room grows too cold, the arms 35$^a$ and 35$^b$ rise. If 35$^a$ and 35$^b$ lower contact is made at 44. 44 is out of the circuit and if the arms 35$^a$ and 35$^b$ continue to lower contact is made at 37. This leads to the wheel 61 and a release circuit is established which is as follows: From battery B, through 120, 34, 35$^a$, 37, 122, 61$^x$, contact wheel 61, shaft 57, 71, release magnet 70 and back to battery B. The actuation of the release magnet 70 releases the arm 64 which permits a quarter of a revolution of the shaft 57, or until the next stop member 63, see Fig. 2, engages the arm 65. The whole system of wheels under the actuation of the clock-work 54, has revolved now into position B shown in Fig. 10. In this position the front draft is closed and the check draft is open. It should be noted that the wheels 58 and 61 are cut off from the contacts 44 and 37, since the springs 58$^x$ and 61$^x$ are in alinement with the cut-away portions of the contact wheels. The only thing that the system can do now is to cool off.

The lever 35$^b$ will first strike the contact 39. This is in electrical connection with the wheel 60, and the release magnet 70 is again actuated through the circuit just traced with the exception that the conductor 123, contact 60$^x$, and contact wheel 60 are in circuit, instead of conductor, 122, contact 61$^x$ and wheel 61. The system will now rotate until the arm 109 is in position C. This again is a neutral position.

There are now two possibilities: First possibility: 60 is out of the circuit and all of the other contact wheels are in circuit. Suppose it continues to grow colder, then contact is made at 36 through the wheel 59 and the system rotates into position D. All the wheels except 58 are now out of circuit. The only thing that the system can do now is to get too hot and the lever 35$^b$ will touch 44 and connection will be made through 58 whereupon rotation will follow until position A is again reached. Second possibility: Suppose it continues to grow hotter; contact is made at 44, and through the wheel 58; the system will now return to position A since there is no difference in the circuit until that position is reached.

Consider the case where the arms 35$^a$ and 35$^b$ rise, contact will first be made at 39 and the wheel 60 and since that completes the circuit the system will rotate to position C which is neutral and the next contact will be made at 36 and the wheel 59. The system now turns to position D. Everything is now out of circuit except the wheel 58, but since the front draft is open and the check draft closed, the only thing that can occur is for the room to get too hot and as soon as this occurs contact will be made at point 44 and the wheel 58, and the system turns to position A.

The object of the four wheels is to give a neutral position and thus to avoid extremes of temperature.

It will be seen from the above description that I have provided a device which not only controls the temperature of a room but the humidity as well. In view of the fact that the best living conditions are dependent upon the humidity as well as upon the temperature, the utility of the device will be at once appreciated.

I claim:

1. In a heating system, a shaft, a plurality of contact wheels carried by said shaft, contacts arranged to be engaged by said wheels, a motor for driving the shaft, means for normally preventing the rotation of the shaft, release means in circuit with said contacts and operated by the engagement of the contact wheels with their respective contacts for permitting the rotation of the shaft, a hygrostatic switch connected with said first-named contacts for controlling the circuit, said hygrostatic switch comprising a pair of arms, a dry thermostatic member for operating one of said arms and a wet thermostatic member for operating the other arm.

2. In a heating system, a heating element, a vaporizer associated therewith, a source of water supply, means for supplying water therefrom to said vaporizer and for cutting off the water from the vaporizer, said means comprising a rotatable shaft, a motor for driving the shaft, a plurality of contact wheels on said shaft, contacts arranged to be engaged by said wheels, means for normally preventing the rotation of the shaft, electro-magnetic means for releasing the shaft to permit the rotation thereof, and hygrostatic means for energizing said electro-magnetic means.

3. In a heating system a "dry" thermostat, a wet thermostat, an arm operated by said dry thermostat, a shaft rotated by said arm, a cam carried by the shaft, an arm operated by the cam, said arm having a pair of contacts, an arm operated by said wet thermostat, a second cam operated by said last-named arm, and a pivot arm arranged to be moved by said last-named cam, for engaging said contacts.

4. In a heating system, a dry wire thermostate, a wet wire thermostat, a movable arm having a pair of contacts, a second movable arm having a pair of contacts arranged to engage the first mentioned contacts, and a differential jointly operated by both thermostats for bringing said contacts into engagement.

5. In a heating system, a dry wire thermostat, a wet wire thermostat, a movable arm having a pair of contacts, a second movable arm having a pair of contacts arranged to engage the first mentioned contacts, a differential jointly operated by both thermostats for bringing said contacts into engagement, a motor, means controlled by the closure of certain of said contacts for actuating the motor, a furnace having a vaporizer, and a water supply for said vaporizer controlled by said motor.

6. In a heating system, a dry wire thermostat, a wet wire thermostat, a pivoted arm actuated by each thermostat, a shaft, means for rotating said shaft through a movement of one of said arms, a cam carried by the shaft, a third pivoted arm operated by said cam, opposed contacts carried by said arm, a fourth arm pivoted on said third-named arm and having contacts arranged to engage the first mentioned contacts, and a differential device operated by the movement of the other of the first mentioned arms for moving said fourth mentioned arm.

7. In a heating system, a dry wire thermostat, a wet wire thermostat, a pivoted arm actuated by each thermostat, a shaft, a gear on said shaft, a segment carried by one of said arms and arranged to engage said gear, a cam carried by the shaft, a third pivoted arm operated by said cam, opposed contacts carried by said arm, a fourth arm pivoted on said third-named arm and having contacts arranged to engage the first mentioned contacts, and a differential device operated by the movement of the other of the first mentioned arms for moving said fourth mentioned arm.

8. In a heating system, a dry wire thermostat, a wet wire thermostat, a pivoted arm actuated by each thermostat, a shaft, a gear on said shaft, a segment carried by one of said arms and arranged to engage said gear, a cam carried by the shaft, a third pivoted arm operated by said cam, opposed contacts carried by said arm, a fourth arm pivoted on said third-named arm and having contacts arranged to engage the first mentioned contacts, a loose gear on said shaft, a segment carried by the other of said arms and arranged to engage said loose gear, and a cam secured to said loose gear for moving said fourth mentioned arm.

ELMER M. JONES.

Witnesses:
WILLIAM A. ROBINSON,
JESSIE M. ABBOTT.